United States Patent [19]
Greco et al.

[11] Patent Number: 5,809,478
[45] Date of Patent: Sep. 15, 1998

[54] METHOD FOR ACCESSING AND EVALUATING INFORMATION FOR PROCESSING AN APPLICATION FOR INSURANCE

[75] Inventors: N. J. Greco, Lebanon, N.J.; E. M. White, Lake Forest, Ill.; S. G. Fine, Antioch, Ill.; G. R. Haught, Cary, Ill.; E. M. Pihl, Lake Barrington, Ill.; G. Bullock, Gurnee, Ill.; James M. Batman, Vernon Hills, Ill.; W. Gillespie, Conway, Ark.; D. Roland, Conway, Ark.; K. Babij, Conway, Ark.

[73] Assignee: Allstate Insurance Company, Northbrook, Ill.

[21] Appl. No.: 569,615

[22] Filed: Dec. 8, 1995

[51] Int. Cl.⁶ .............................. G06F 17/60; G06F 17/40
[52] U.S. Cl. .......................... 705/4; 395/925; 395/200.3; 395/200.31; 395/200.47
[58] Field of Search ....................................... 395/204, 925, 395/200.3, 200.31, 200.32, 200.33, 200.47, 200.48, 200.49, 200.56, 200.59; 705/4

[56] References Cited

U.S. PATENT DOCUMENTS 4,975,840  12/1990  DeTore et al. ........................... 364/401
5,611,052   3/1997  Dykstra et al. ........................... 395/238

OTHER PUBLICATIONS

Denison Hatch, "The Assisted Suicide of Database Marketing", Target Marketing, v 16, n 10, pp. 8–9, Oct. 1993.

"Prism Solutions Automates Data Warehouse Development for the Client Server Environment", Prism Solutions, Inc., May 4, 1993.

*Primary Examiner*—Gail O. Hayes
*Assistant Examiner*—William N. Hughet
*Attorney, Agent, or Firm*—Finnegan, Henderson, Farabow, Garrett & Dunner, L.L.P.

[57] ABSTRACT

A method of controlling a computer network to render information needs and risk evaluative decisions includes the matching of profiles, defined by data characteristics and collective characteristics, to customer data. Multiple profiles are matched to arrive at a consensus decision, in addition to providing a rationale and summary analysis of the decision. Advice profiles provide advice, when matched, regarding customer data.

16 Claims, 9 Drawing Sheets

5,809,478

METHOD FOR ACCESSING AND EVALUATING INFORMATION FOR PROCESSING AN APPLICATION FOR INSURANCE

I. CROSS-REFERENCE OF APPLICATION

This is a new application which incorporates U.S. patent application Ser. No. 08/374,484, filed Jan. 17, 1995, now abandoned herein by reference.

II. BACKGROUND OF THE INVENTION

The present invention relates generally to computer decision-making systems, and in particular to the use of computer networks to gather information relevant to insurance-related decisions.

Insurance companies issue policies to insure against different types of risk. The amount they charge for such policies should accurately reflect the risk insured against so the companies can offer profitable, but competitively priced, policies. Thus, accurate risk evaluation is essential for such companies to make rational business decisions.

Historically, risk evaluation was performed by underwriters who are individuals with expertise in assessing risk based on many factors. These underwriters, or "Risk Evaluators," work in conjunction with insurance agents to collect and analyze data representing factors affecting the risk associated with a particular customer.

Of course, the accuracy of the risk evaluation depends upon the accuracy of the data forming the basis for the evaluation. Traditionally, this data, such as driving records, credit records, and name and address records, was acquired from independent sources with their own formats and request requirements. The collection of this data and the necessary conversions between incompatible formats has proven expensive and burdensome. With the automation of risk evaluative decision-making, this expense and burden has only increased.

At the same time, customers are increasingly seeking agents able to handle all transactions knowledgeably and efficiently, anticipating future needs, and delivering core benefits expeditiously. Current systems, however, hamper efforts to achieve these goals. Agents are given limited access to information, and an unnecessarily large number of transactions are referred to the underwriting environment. As a result, Risk Evaluators often spend an excessive amount of time on individual risk selection, rather than on assisting agents in broader market management activities.

To reduce overhead, insurance companies now use computer systems to help Risk Evaluators perform their assessment. These systems also facilitate communication between Risk Evaluators and agents, improve the speed and accuracy with which insurance policies are processed, and increase the overall quality of the insurance product purchased by consumers.

In spite of the increasing use of computers, insurance companies' efficiency is still limited. Until recently, there had been no comprehensive system automating the collection of information from agents and other sources and performing risk evaluations based on that information.

III. SUMMARY OF THE INVENTION

In accordance with the purpose of the invention, as embodied and broadly described herein, the invention is a method of controlling a computer network to assemble data and render decisions based on the data, the network including a method of controlling a computer network to assemble data and render decisions based on the data, the network including a main computer having a memory, and a data warehouse computer coupled to vendors of data, the method comprising the steps, performed by the main computer, of receiving a request to process an application at the main computer; determining whether additional data is needed to process the application; invoking information interface processes to retrieve the needed additional data through the data warehouse computer; and processing the application with the additional data received through the data warehouse.

Both the foregoing general description and the following detailed description are exemplary and explanatory. They provide further explanation of the invention as claimed.

IV. BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention.

V. DETAILED DESCRIPTION OF THE PREFERRED EMBODIMENTS

A. OVERVIEW

1. Data Retrieval and Evaluation

Figure 1:
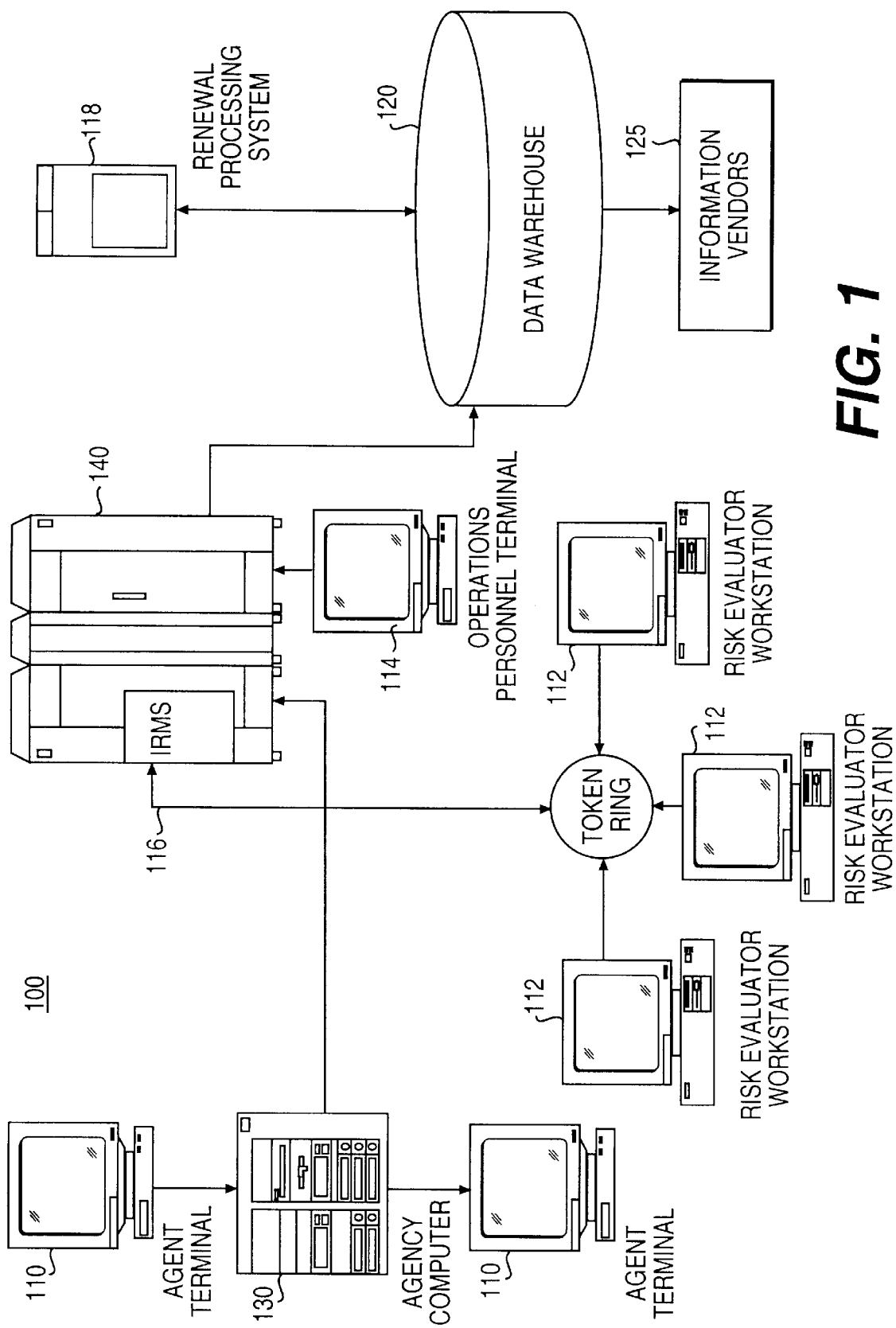
FIG. 1 is a block diagram depicting the overall processing of information according to one embodiment of the present invention.

FIG. 1 is a block diagram 100 illustrating the general flow of data-retrieval and decision-making processing according to one embodiment of the present invention. The present invention uses a computer network to retrieve and assemble customer data for use in rendering decisions based on that data.

As FIG. 1 shows, there are five sources of requests for customer data. Three are human: agents at terminals 110, Risk Evaluators at terminals 112, and operations personnel at terminals 114. Two are automated: integrated risk management system (IRMS) 116 and renewal processing system 118. All five sources transmit their requests to a data warehouse system 120 providing access to external sources of information known as information vendors 125.

Information vendors 125 vary depending upon the information requested. For example, one information vendor may be a state agency providing motor vehicle records for the citizens of that state. Another information vendor may provide credit reports for customers nationwide. Despite such differences, the requests are sent in a uniform format, regardless of the information vendor providing the requested information, and the sources of the requests receive information in a uniform format Preferably, agents at terminals 110 make requests to data warehouse system 120 directly from the AS/400 130 to a mainframe computer 140, and Risk Evaluators at terminals 112 make requests through IRMS system 116. Operations personnel at terminals 114 can make customer data requests through a mainframe computer 140, independent of any of the automated requesters. IRMS system 116 and renewal processing system 118 make customer data requests independent of, and in addition to, any human requesters.

Figure 2:
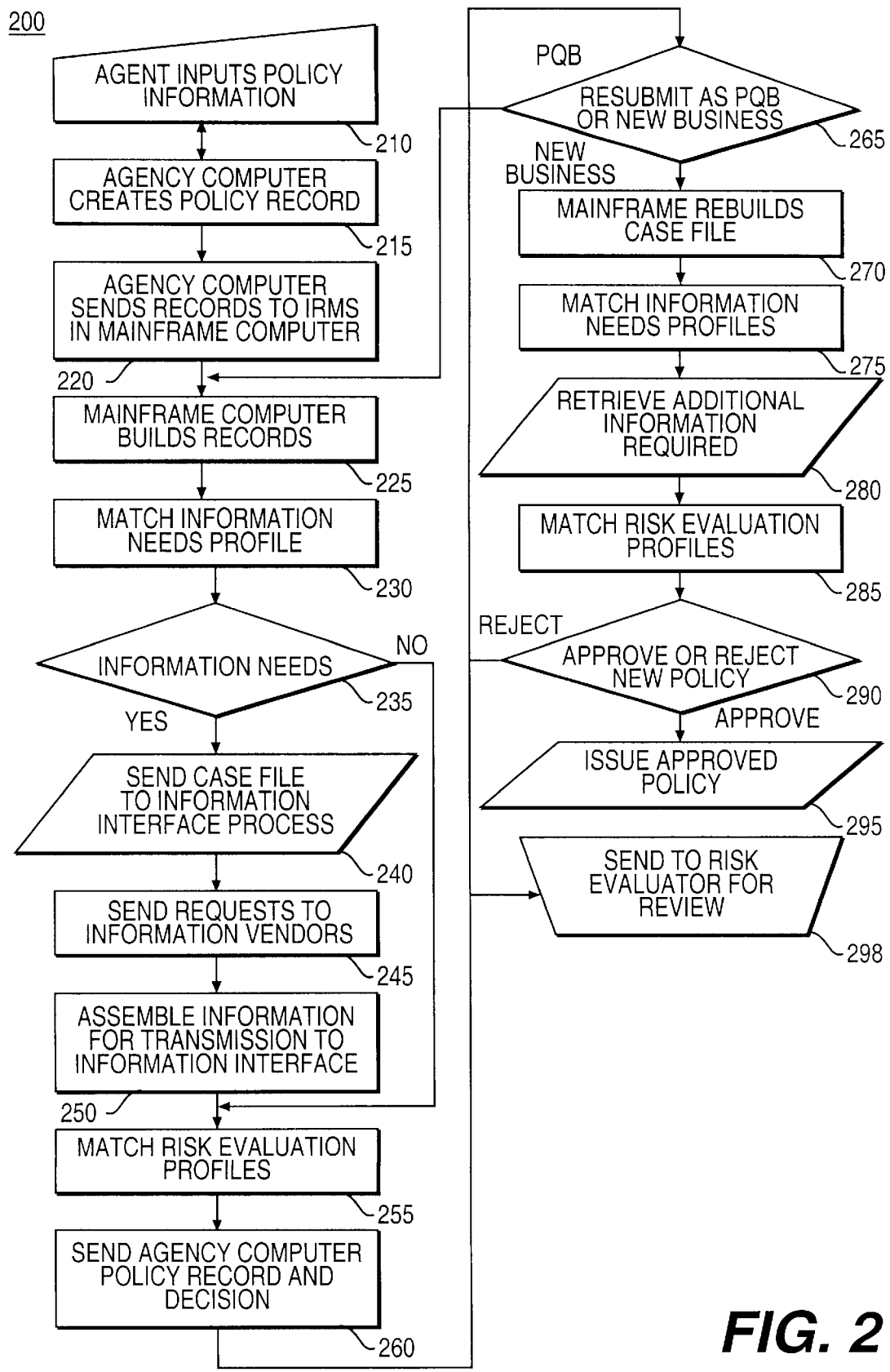
FIG. 2 is a flow chart depicting the overall flow of automated data retrieval according to one embodiment of the present invention.

FIG. 2 is a flow diagram 200 illustrating the general flow of a customer data retrieval and evaluation process according to this invention. In particular, flow diagram 200 depicts the process flow of an IRMS automated customer data request.

Prior to the automated request, insurance agents provide the primary human contact with potential policy holders and obtain customer data pertinent to the desired policy. For example, in an automobile insurance policy, this customer data may include the driver's age, the type of vehicle to be insured, and the driver's driving history. An agent enters this data into an agent terminal linked to the agency computer. (Step 210) In response, the agency computer creates a policy record containing this data, and assigns the record a unique identification number. (Step 215)

Before understanding the remaining flow, it is helpful to understand the three stages of policy analysis under RMS. First, policies undergo Prequalification Business (PQB) analysis. If a policy is not rejected during this stage of processing, the policy qualifies as New Business and is further analyzed in a second stage of analysis prior to issuance. Finally, in a third stage, existing policies undergo periodic renewal analysis.

Preferably, the agency computer sends policy records intended for PQB analysis into the IRMS system embodied in a mainframe computer system. (Step 220) The mainframe computer builds a case file corresponding to each submitted policy record. (Step 225)

When a case file is built, a work flow manager process operating within the mainframe computer directs the case file through a series of processes designed to perform risk assessment. Usually, the system first evaluates a case file to determine what information is needed to perform risk assessment properly. IRMS uses an expert system engine to perform a series of complex pattern matchings using "profiles" of information needs. (Step 230) Profiles are combinations of criteria used to render a decision about customer data.

The expert system determines the information needed based on any successful profile matches. (Step 235) Then the work flow manager forwards the case file, as well as an indication of the needed information, to an information interface process. (Step 240)

The information interface process automatically packages and sends customer data requests to both a local client file system and a data warehouse computer providing electronic access to external sources of information, such as information vendors. In response, the data warehouse computer sends requests to different information vendors (Step 245), and assembles the retrieved information for transmission back to the information interface. (Step 250) The information interface of the mainframe computer then automatically updates the case file with the retrieved information, and the work flow manager then directs the case file back to the risk assessment process.

The same expert system engine that determined what information was needed also performs the actual risk evaluation. The expert system matches the data in the case file to a series of risk evaluation profiles to determine the quality of the risk, to classify the risk correctly, and to generate advice for an agent. (Step 255) If possible, the expert system then renders a decision to accept or reject the policy according to the profile matches, and sends the agency computer the policy record and decision. (Step 260)

Depending on the decision made during risk assessment and the information returned to the agency computer, the agency may resubmit a PQB policy several times for further data retrieval and risk evaluations. (Step 265) Once accepted, a PQB policy returned to the agency becomes a New Business policy.

In the preferred implementation of this invention, the agency submits New Business policies to the mainframe computer for final risk evaluation before issuing the policy. The expert system in the mainframe computer uses essentially the same procedures to evaluate New Business policies as it does to evaluate PQB policies. The final risk evaluation reevaluates the New Business policy in light of any last minute changes made by the agency.

To perform this final evaluation, the work flow manager communicates New Business policies from the agency computer to the mainframe computer via a batch processing network, such as an overnight batch exchange. After the case file is rebuilt (Step 270), the expert system matches information needs profiles with the case file. (Step 275) If additional information is required, the mainframe computer invokes the information interface processes to retrieve such information through the data warehouse. (Step 280) Finally, the expert system again matches risk evaluation profiles to the case file to render a decision. (Step 285)

If the expert system approves the New Business policy during the second risk evaluation (Step 290), the work flow manager automatically submits the policy for issuance. (Step 295) If the expert system rejects the New Business policy, the work flow manager directs the rejected policy to a Risk Evaluator workstation for review by a Risk Evaluator. (Step 298) The Risk Evaluator may then decide to confirm the decision rejecting the policy, or decide to accept the policy notwithstanding the previous decision to reject. Further, as mentioned above, the Risk Evaluator may make new customer data requests through the IRMS system.

The expert system is connected to a network connecting agents, risk evaluators, and information sources. The expert system refers to the hardware and software systems of the present invention discussed in more detail below.

With this general understanding of the data gathering and risk evaluation processes, a more detailed understanding of the preferred embodiment is possible. That embodiment contains both hardware and software systems.

2. Hardware And Software Systems

Figure 3:
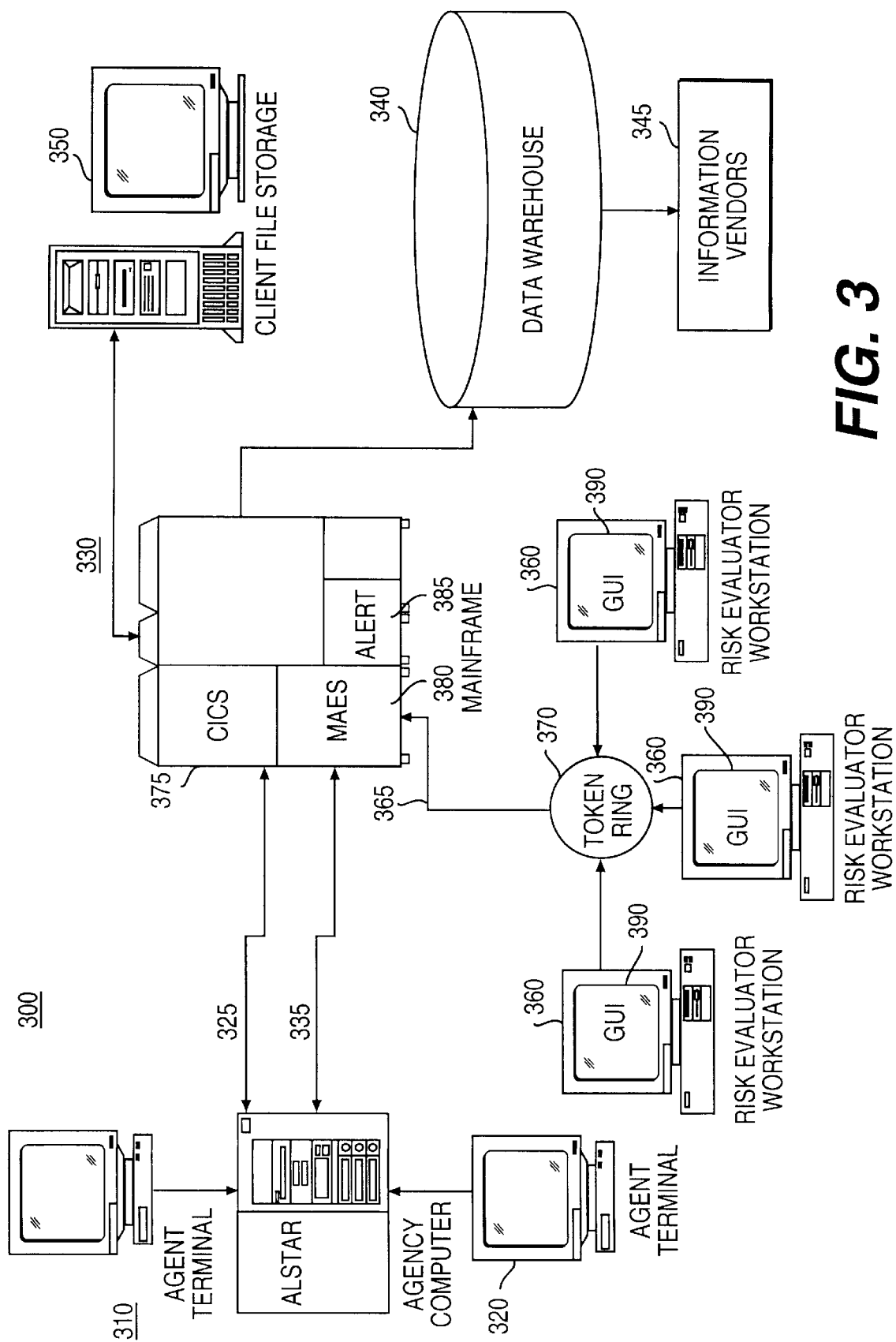
FIG. 3 is a block diagram depicting the hardware and software systems of the present invention.

FIG. 3 is a block diagram 300 of the hardware and software systems of the preferred embodiment. Agent terminals 310 are fixed-function terminals connected to an agency computer 320. Agency computer 320 may be an IBM AS/400 mini-mainframe or any processor capable of handling the processing load for terminals 310. Agency terminals 310 and agency computer 320 preferably reside on-site at insurance agencies, although terminals 310 may be portable and located off-site. Agency computer 320 may also be off-site.

Agency computer 320 preferably operates in a known software environment 325 known as "ALSTAR." ALSTAR provides displays of case information, communicates with a mainframe computer 330, and provides generalized word processing functions for terminals 310.

Mainframe computer 330 is also linked to other facilities for information storage and retrieval. A data warehouse computer 340, communicating with mainframe computer 330 via a dedicated line, gathers needed external information from information vendor computers 345. A client file storage facility 350 also connected to the mainframe computer stores internal customer data files.

Mainframe computer 330 connects to Risk Evaluator workstations 360 over dedicated lines 365 via, for example, a modem and a token ring local area network 370. Of course, network 370 need not be a token ring as long as it provides the communications necessary for this system.

Preferably, mainframe computer 330 includes two main address space areas 375 and 380 each corresponding to a different software operating environment. Mainframe computer 330 also preferably includes another smaller address space 385 for a system administration environment.

Most of the processing associated with the present invention takes place in the Customer Information Control System (CICS) environment in address space 375. The Multitasking Aion Execution System (MAES) environment in address space 380 runs the majority of expert system modules. An Alert environment in address space 385 maintains existing customer files, controls renewal processing, and issues policies.

Each Risk Evaluator workstation 360 preferably includes a DOS-based personal computer running a graphical user interface program 390 that displays case information records and allows workstations 360 to interact with each other and with mainframe computer 330.

B. AGENCY OPERATIONS

According to the present invention, agency computer 320 provides agents with a user interface on terminals 310 for displaying policy information and decisions, and enables the agents to interact with mainframe computer 330. Specifically, the user interface allows an agent to enter customer data into prequalification policy templates and update existing policy files for new business or renewal processing, to display decision results to agents and allows them to enter customer data requests and changes to policy data, and to order any available data for a particular customer from participating information vendors.

Once an agent completes the templates, agency computer 320 formats the customer data into policy records and transmits these files to mainframe computer 330. Mainframe computer 330 sends its risk evaluative decisions back to agency computer 320 through either batch processing or real-time links 325 and 335. Agency computer 320 then enters each policy into a queue associated with the agent handling that policy.

In displaying decision results and receiving customer data requests and changes to policy data, agency computer 320 maintains the user interface locally. It sends policy records and data requests to mainframe computer 330, however.

Figure 4:
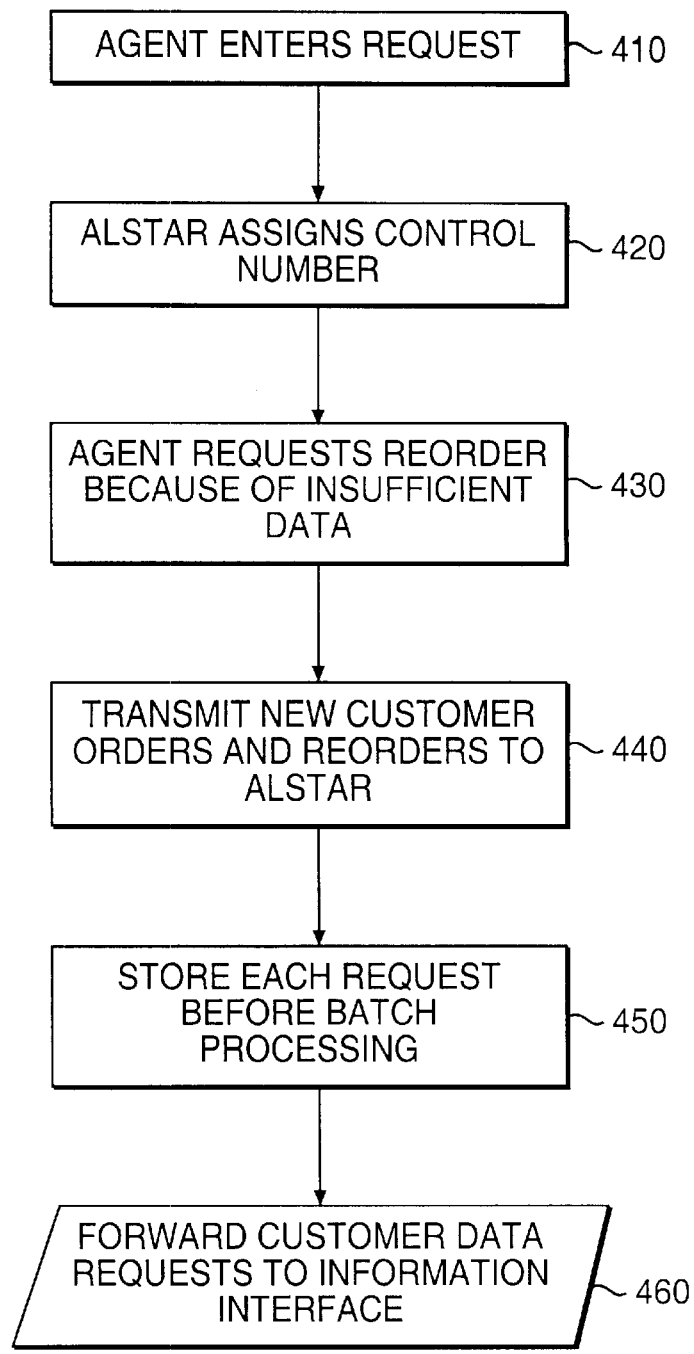
FIG. 4 is a flow chart depicting information processing flow according to the present invention.

FIG. 4 contains a flow chart 400 depicting information processing flow for agency operations. An agent enters a request in a template on the ALSTAR system running on the mainframe at the agent's location. (Step 410) The ALSTAR system assigns the customer data order a data warehouse (DW) control number, which is a pre-issue policy number used for future identification and verification of the order. (Step 420) This pre-issue policy number may not be the ultimate policy number issued because several policies may be prequalified in order to write one piece of new business.

If a customer data order is returned without the proper data because of an error in customer identification, for example an incorrect Social Security Number, an agent may request a reorder through the ALSTAR system running on the mainframe at the agent's location. (Step 430) The reorder is performed under the original pre-issue policy number.

Both new customer data orders or reorders are then transmitted to the ALSTAR system operating in the CICS environment of the mainframe computer. (Step 440) Each request is stored prior to batch processing to maintain a request record for verification upon return of the data. (Step 450) The customer data requests are then forwarded to the information interface running on the mainframe computer. (Step 460) This activity is discussed below in greater detail.

C. RISK EVALUATOR AND OPERATIONS PERSONNEL DATA REQUESTS

As explained above, the mainframe computer will send policies to Risk Evaluators at their workstations for review in several situations. As part of this review, Risk Evaluators can place customer data orders through the mainframe computer system to the data warehouse system.

Figure 5:
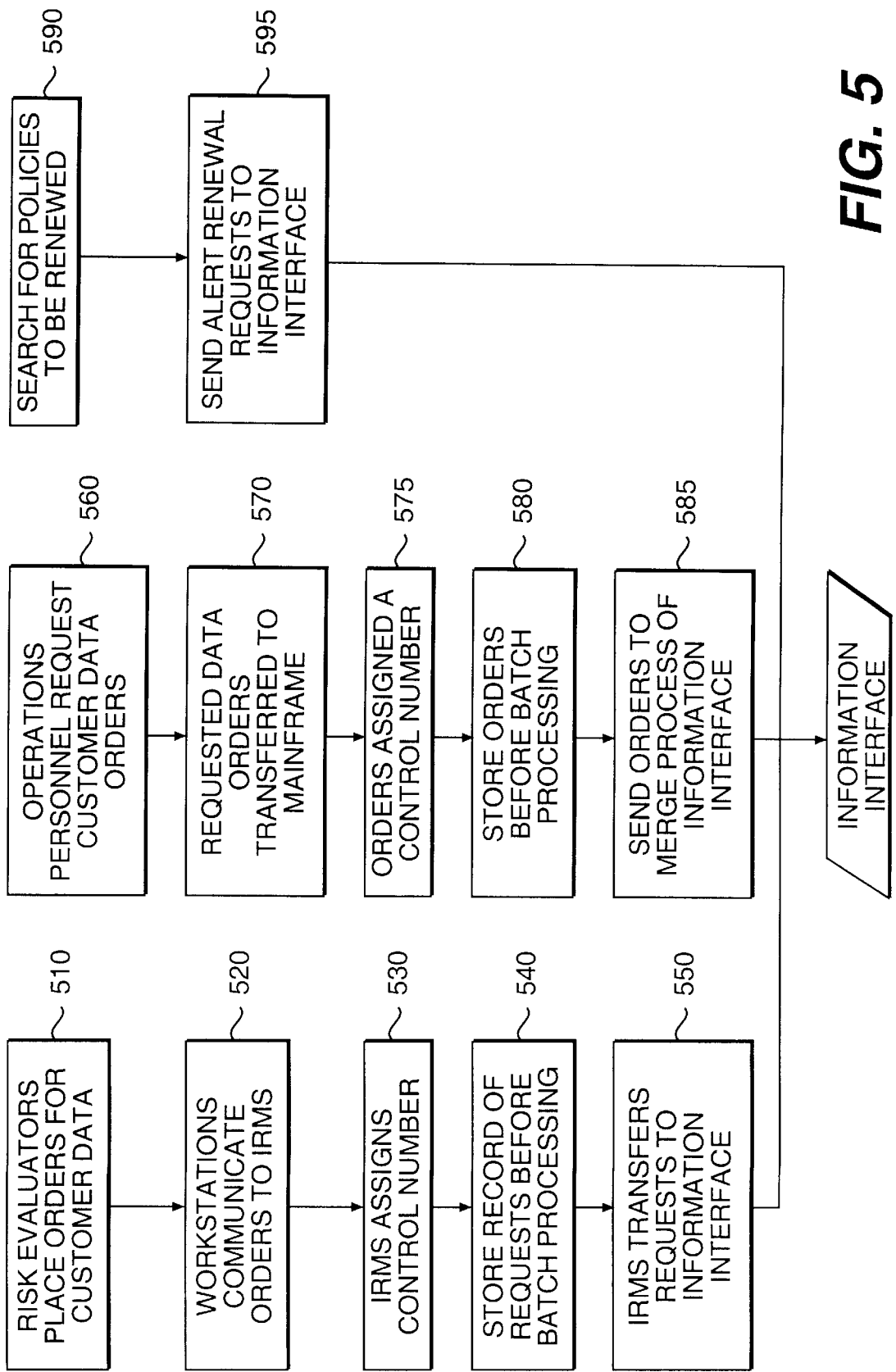
FIG. 5 is a flow chart depicting the flow of information processing according to the present invention.

FIG. 5 shows a flow chart 500 depicting information processing flow for risk evaluation. Through a graphical user interface, Risk Evaluators place orders for customer data at their workstations (Step 510), and the workstations communicate these orders to the MMS system. (Step 520)

As with customer data requests originating at the agencies, IRMS first assigns the customer data request a DW control number if one has not already been assigned. (Step 530) A record of the requests is stored prior to batch processing for later verification. (Step 540) Finally, IRMS transfers the requests to the information interface (Step 550), and processing continues as discussed below.

In addition, operations personnel at the mainframe computer sites or elsewhere may request customer data orders (Step 560) which are transmitted to the mainframe computer. (Step 570) The orders are assigned a control number corresponding to a pre-issue or issued policy number (Step 575), stored prior to batch processing (Step 580), and sent to the merge process of the information interface (Step 585), described in more detail below.

Customer data requests by the renewal processing system originate from the ALERT software environment on the mainframe computer system. A search of policies up for renewal determines which policies require additional information prior to a renewal decision. (Step 590) The ALERT renewal requests are then sent to the information interface running on the mainframe computer. (Step 595)

D. MAINFRAME COMPUTER OPERATIONS AND DATA REQUESTS

1. IRMS Data Requests

Figure 6:
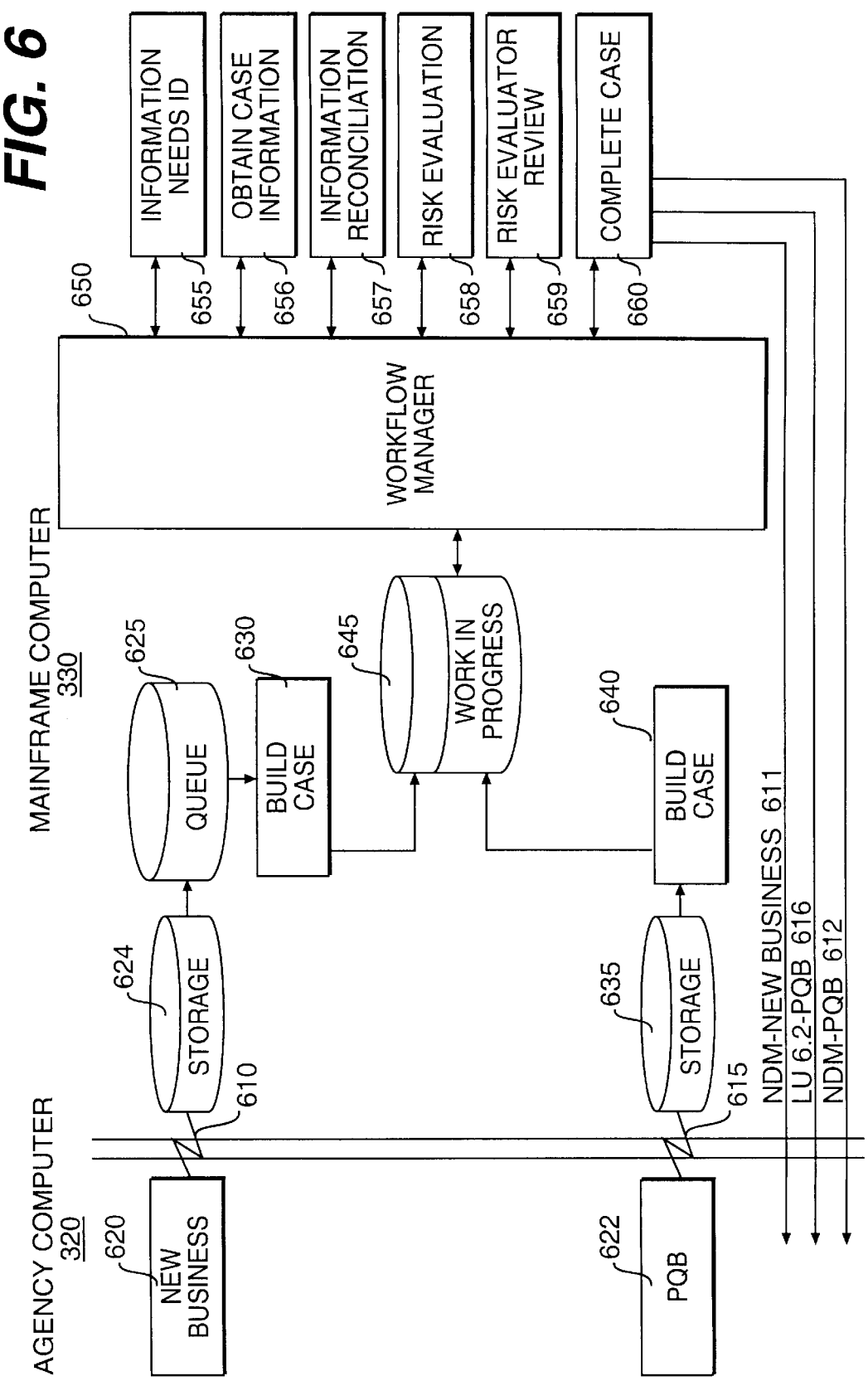
FIG. 6 is a flow chart illustrating process flow from the agency computer to the mainframe computer.

FIG. 6 is a communications diagram 600 showing the communication links between agency computer 320 and mainframe computer 330 in more detail. FIG. 6 also includes a high-level architectural diagram of mainframe computer 330.

Batch-processing link 225 in FIG. 2 includes batch-processing links 510, 511, and 512. Under automated risk evaluation, agency computer 320 sends New Business policies 620 to mainframe computer 330 via batch-processing link 610. Mainframe computer 330 sends evaluated policies to agency computer 320 via batch-processing links 611 and 612.

Real-time link 235 in FIG. 2 includes links 615 and 616. Agency computer 320 sends PQB policies to mainframe computer 330 via the real-time LU6.2 link 615. Mainframe computer 330 sends PQB policies 622 to agency computer 320 via real-time LU6.2 link 616. Also, the communications links 610, 611, 612, 615, and 616 consist of permanently dedicated lease lines connecting modems at either computer system.

Mainframe computer 330 initially stores New Business records in an intermediate storage area 624. Computer 330 then transfers those records to a queue 625. A case building process 630 retrieves the records from queue 625 and translates them into IBM DB2 format, a relational database format, using pointers to access policy information. A policy stored in this format on the mainframe computer 330 may be referred to as a "case." Case building process 630 is not part of CICS operations.

A work-in-progress (WIP) database 645 stores the case information in relational database tables. Each table stores a particular piece of data for a case and is indexed by the unique case or policy number associated with that piece of data. Thus, one particular table may store the zip codes for each case. Several other relational database tables, not shown in FIG. 6 store profiles, statistics, and other data used by mainframe computer 330.

Mainframe computer 330 stores PQB policies temporarily in the intermediate storage area 635. Because PQB policies are received on a real-time basis, they are not queued. Instead, case building process 640 formats the PQB policies and stores them in WIP database 645. Once either a New Business or PQB case populates WIP database 645, a status of the case is set to "active."

Work flow manager process 650 directs the processing of active cases and the execution of most processes within the CICS environment of mainframe computer 330. Work flow manager process 650 accesses WIP database 645 and selects all active cases for processing. Process 650 then routes these cases according to routing rules that incorporate case type (e.g., New Business or PQB), product ID, and process completion codes. Specifically, process 650 routes active cases through information needs identification (INI) subprocess 655, obtain case information subprocess 656, information reconciliation subprocess 657, risk evaluation subprocess 658, risk evaluator review subprocess 659, and complete case subprocess 660.

Figure 7:
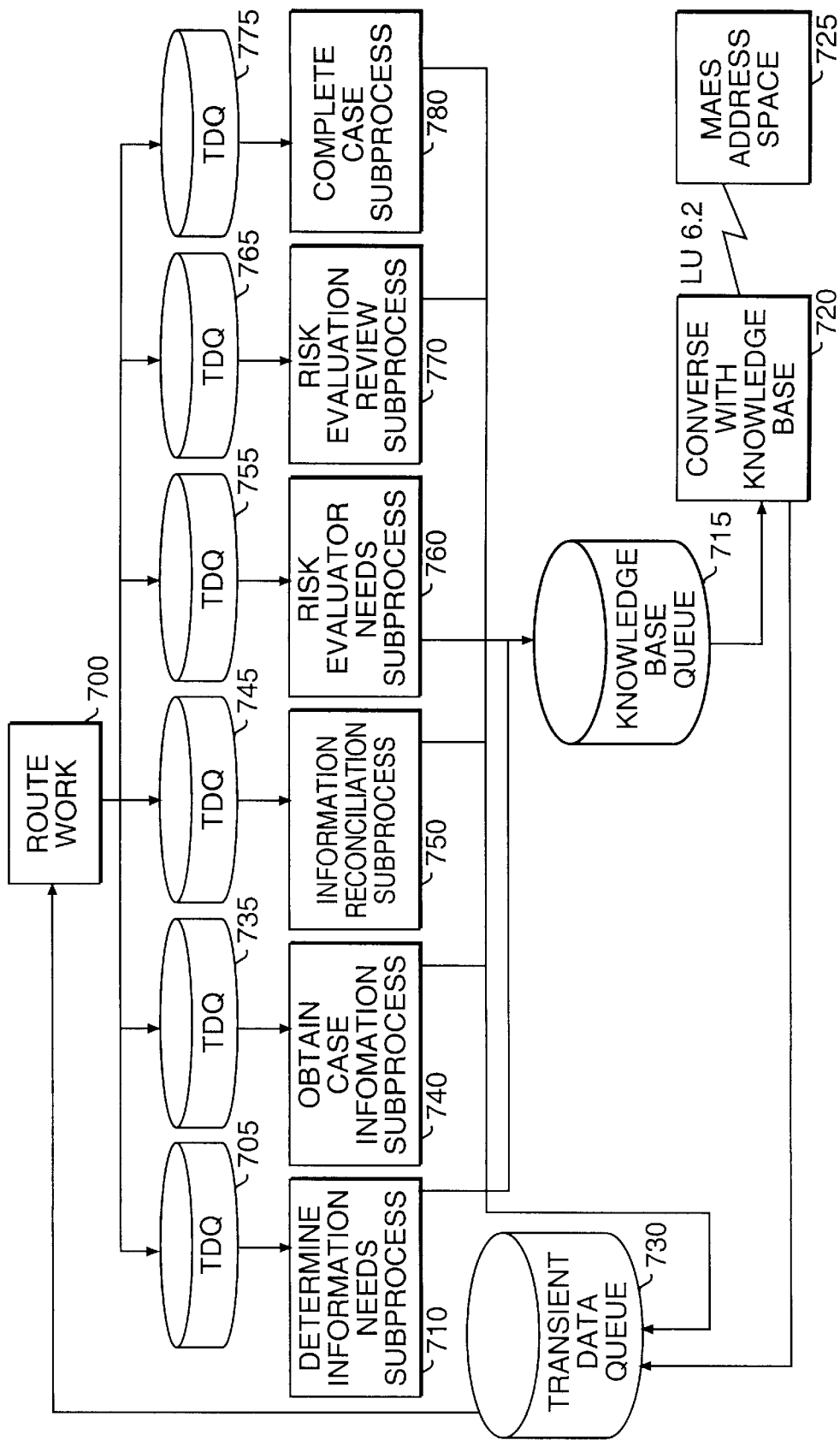
FIG. 7 is a flow chart illustrating high-level process flow in the mainframe computer.

FIG. 7 is a flow chart showing how work flow manager 650 controls subprocesses 655–660. Work flow manager 650 includes a Route Work subprocess 700, the controlling subprocess of the work flow manager process. Route Work subprocess 700 first routes an active case through INI subprocess 655 by placing a case identifying pointer in a Transient Data Queue (TDQ) 705 associated with the INI subprocess 655. TDQs are temporary storage areas that trigger associated processes on a particular case whenever TDQ 705 contains a pointer identifying that case. Retrieving a pointer to a case from a TDQ 705 may remove a case file's active status in WIP database 545 until the associated processing is completed.

INI subprocess 655 then determines the information needs (Step 710) using the same knowledge base decision-making process as is employed for risk evaluation. The difference is that decisions rendered through INI subprocess 655 concern the information required to render risk evaluations, not the risk evaluations themselves. The different results arise because the processes use different types of profiles. The decisions result from matching those profiles to the case information.

Once it receives a case for processing, INI subprocess 655 updates a knowledge base queue 715 with the case pointer and an appropriate profile set identifier indicating which set of profiles should be matched to the case. Profile sets may differ by state and type of insurance. Processing continues with conversing process 720 providing communications with the knowledge base address space 725. When the knowledge base INI processing is completed, a process message is returned to process 720, and the main TDQ 730 is updated, providing for further routing of the case by the Route Work subprocess 700.

Route work subprocess 700 then routes the case to TDQ 735, constituting intermediate storage for the obtain case information subprocess 656. Subprocess 656 executes information interface processes, described below and shown in FIG. 5 as Step 550, to gather all internal and external data that INI subprocess 655 determined to be required. Once this data is gathered (Step 740), subprocess 656 updates the case file in WIP database 645. The case then proceeds back through TDQ 730.

Cases needing external data will be placed in a "pended" status in the WIP database 645 until the external data is received. When the external data is received, Route Work subprocess 700 routes the case to the information reconciliation subprocess 657 through TDQ 745. In Step 750, information reconciliation subprocess 657 reconciles the initial customer data provided by the agency with the data obtained in obtain case information subprocess 656. After a successful reconciliation in subprocess 657, the case returns to TDQ 730 for further routing.

If the two sets of data cannot be reconciled, the knowledge-base engine nevertheless renders a decision, and mainframe computer 330 transfers the case back to agency computer 320 for further processing. This agency processing, called data "scrubbing," reconciles conflicting data. Following data scrubbing, agency computer 320 resubmits the case for evaluation by mainframe computer 330.

With all of the necessary information obtained and reconciled, Route Work subprocess 700 sends the case to risk evaluation subprocess 658 through TDQ 755. The same knowledge base engine is used for the risk evaluation as that used in INI subprocess 655. Thus knowledge base queue 715 is updated with the appropriate case pointer, and invokes the process 720 for providing communications with the knowledge base processes 725 described below. Upon completion of the risk assessment processes, the case returns to its active status and waits in TDQ 730.

Depending on the decisions made during the INI subprocess 655 and risk evaluation subprocess 658, Route Work subprocess 700 may send a case to risk evaluator review subprocess 659 via TDQ 765. A Risk Evaluator reviews the case (Step 770), the case returns to TDQ 730, and is given active status in the WIP database.

After the system has rendered a decision on a case, Route Work subprocess 700 sends the case to complete case subprocess 160 via TDQ 775. Subprocess 660 completes the case (Step 780), and the case is then either routed with the decision results to the initiating agency computer 320 or mainframe computer 330 completes a New Business case by updating the policy status and sending the policy to conventional policy issuing processes (not shown) within the Alert environment.

Although it is usually not necessary, complete case subprocess 660 can route New Business cases to agency computer 320 via an output queue 565. Mainframe computer 330 sends these cases to agency computer 320 in batches. Mainframe computer 330 sends PQB cases that have waited for external data in the same manner, but sends other PQB cases in real-time over LU6.2 link 616.

2. 1. Renewal Processing and Data Requests

After the initial risk assessment process of PQB and New Business policies, there are several instances where existing policies must again be evaluated. Generally speaking, this subsequent review is termed "renewal processing."

Scheduled renewal processing occurs when existing policies reach a scheduled age, such as one year. The Alert process operating on the mainframe computer monitors the age of existing policies and initiates processing of those policies reaching a renewal process initiation date. This date is defined as the policy effective date plus the lead time required by the renewal processing system to provide customers with nonrenewal notification, order and receive any necessary information, and allow review by a human Risk Evaluator, if necessary.

E. INFORMATION INTERFACE

Figure 8:
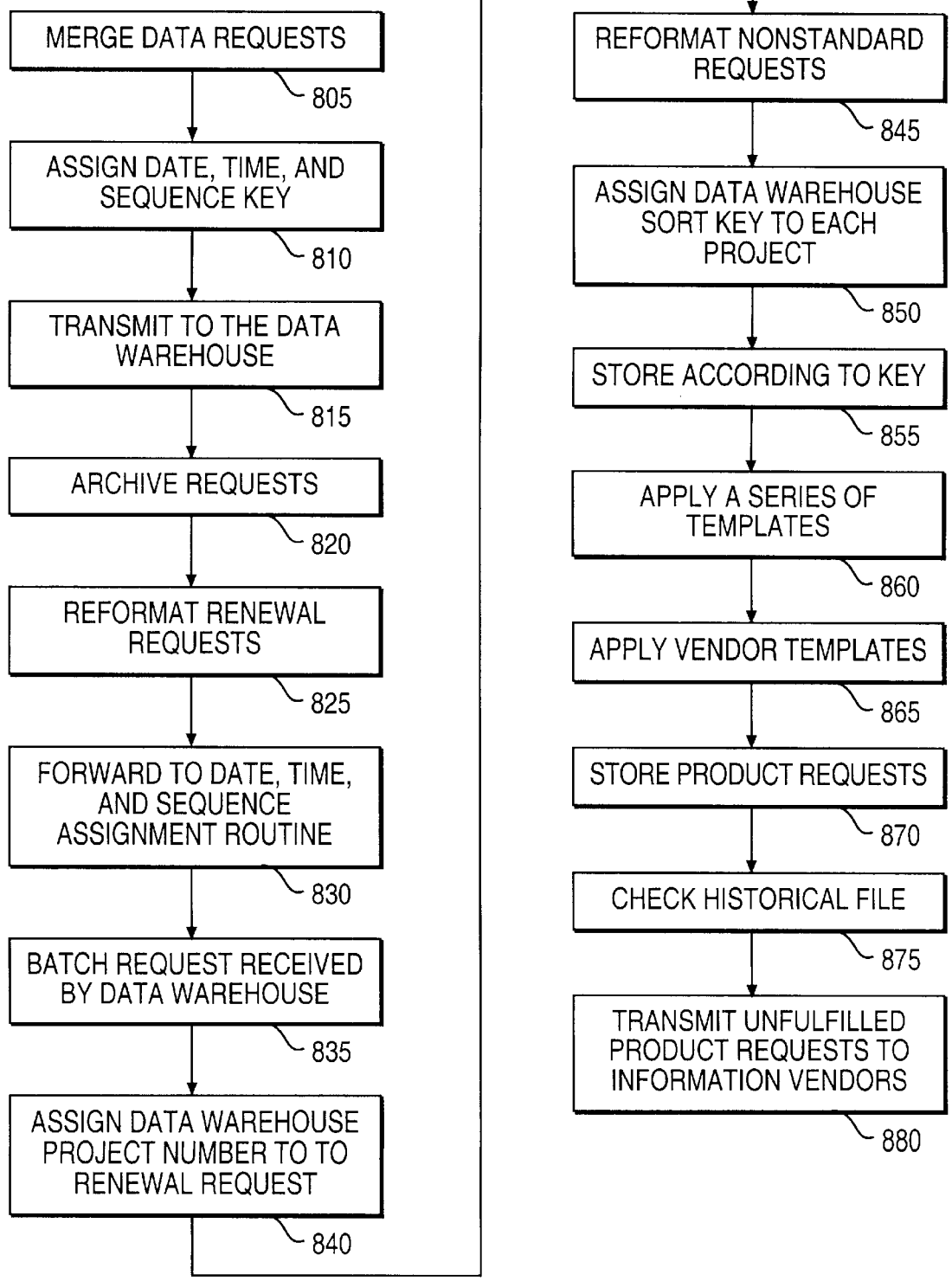
FIG. 8 is a flow chart illustrating the information interface between the mainframe computer and the data warehouse computer system.

FIG. 8 shows the information interface 550 (FIG. 5) running on the mainframe computer is responsible for communication between the mainframe computer and the data warehouse computer system. As described above, customer data requests originating from both human and automated requesters are ultimately sent to the information interface routine. The one exception, discussed below, is that renewal customer data requests are not merged with the other human and automated requests.

When the customer data requests are sent to the information interface, they are first merged into one large batch. (Step 805) The batch is assigned a date, time, and sequence key prior to transmission to the data warehouse computer. (Step 810) During transmission to the data warehouse computer (Step 815), the batch of requests is archived for purposes of later verification. (Step 820)

Customer data requests from ALERT that constitute renewal requests are first reformatted within the information interface to comport with the format of the other DW requests. (Step 825) Once reformatted, the ALERT DW requests are forwarded to the date, time, and sequence assignment routine. (Step 830) Because the renewal requests constitute such a large volume of the processed requests, they are not merged in a batch with the other requests. Although renewal requests are processed more frequently and independently of the other requests, the same type of processing occurs for renewal requests as occurs for other requests.

Once the data warehouse computer receives a batch request (Step 835), a series of processing steps must be performed to break each policy requiring information into its constituent parts, such as by individual or household, and then by the information required for that individual or household.

First, renewal requests are assigned a data warehouse project number. (Step 840) Any non-standard requests, such as those from extremely old policies lacking certain information, are reformatted before processing. (Step 845) Next, each policy is assigned a data warehouse sort key to facilitate the breakdown processing of policies to individuals and information products. (Step 850)

Each information request is stored in a historical file according to the data warehouse key on an individual and household basis. (Step 855) This historical file allows the system to retain large amounts of data to service future requests without having to access external sources.

Using a series of matches, the historical file is accessed for previously-ordered motor vehicle reports. The first match looks at the state issuing the driver's license and driver's license number. The next match looks at the date of birth, and the last match examines the first four characters of the last name. All three matches must exist to fill a motor vehicle record through the historical file.

Only two matching searches are needed to access this historical file for claim activity history, however . The first search is by zip code, the first ten bytes of the last name, and the first 15 bytes of the address. The second search uses the last 15 bytes of the last name, the last ten bytes of the address, the vendor account number, social security number, driver's license state, and driver's license number.

The system may apply a series of templates depending on the order type (renewal or PQB) and the region or state the request comes from. (Step 860) Thus, for example, if the information available for households in the State of Texas is limited to motor vehicle records and credit reports, a template will be applied to a request from Texas which will limit the information obtained to those two categories regardless of the request made by the requester.

Next, the system applies a number of vendor templates to the broken-down customer data requests. (Step 865) Depending on the information requested and the state or region involved, the customer data request must be formatted to comply with the requirements of a particular information vendor. For example, a motor vehicle record request to the State of Texas must be formatted differently than such a request to the State of Illinois. Similarly, a credit report request may be formatted differently depending upon the vendor involved.

The product requests are then stored for use in later verification. (Step 870) The historical file, discussed above, is then checked to determine whether the information resides within the data warehouse computer system. (Step 875) Finally, unfulfilled product requests are transmitted to third-party information vendors. (Step 880)

Figure 9:
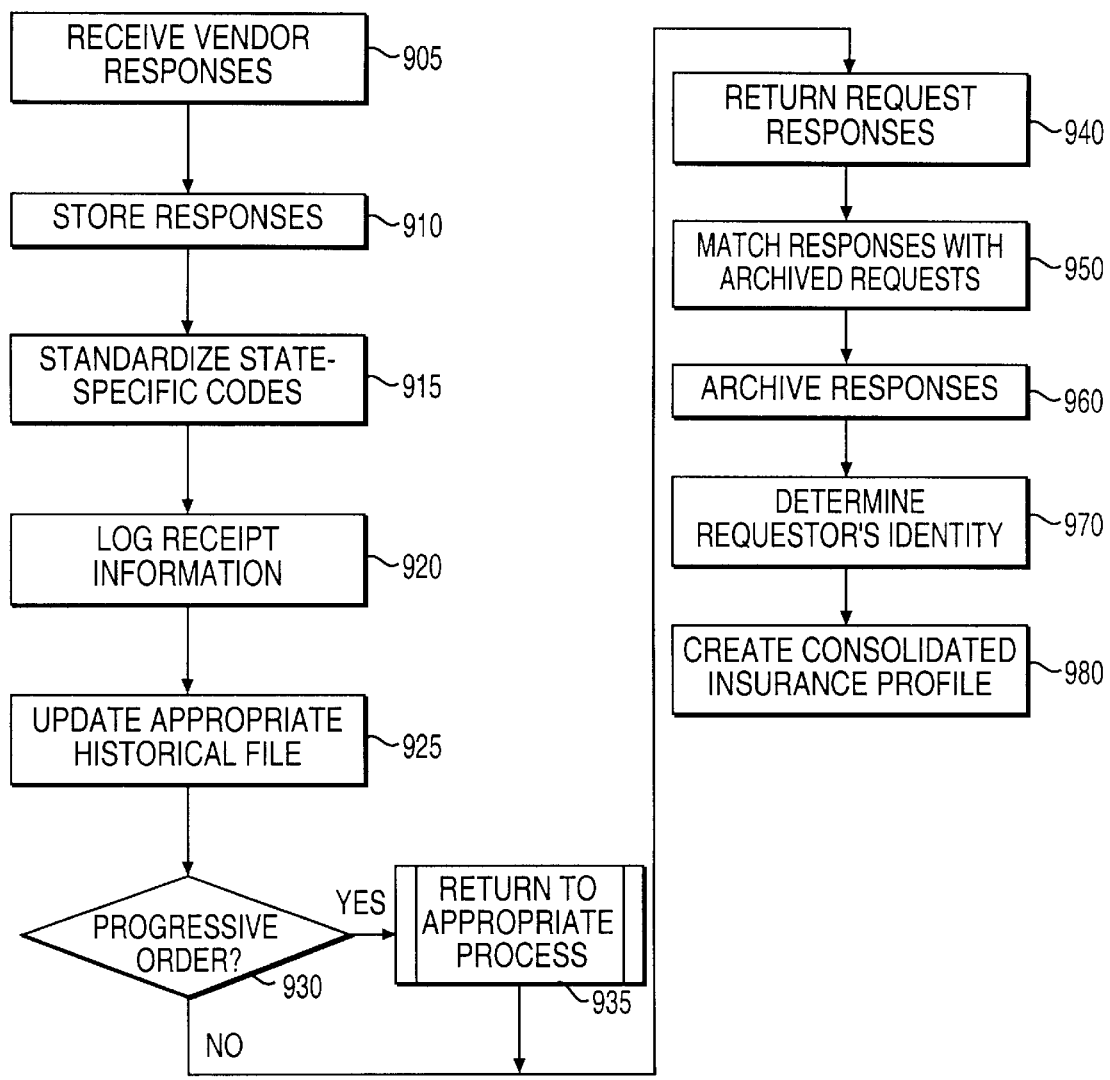
FIG. 9 is a flow chart illustrating bow responses to requests are handled.

FIG. 9 is a flow diagram 900 showing how responses to requests are handled. First, the information vendor responses to the customer data requests are received. (Step 905) The responses are stored (Step 910), and any state-specific codes are standardized for use by the requestor. (Step 915) The time and date when the response is received is logged to verify that all requests sent out have indeed been received. (Step 920)

Depending upon the response received, the historical file, discussed above, is updated with new information. (Step 925) Further, depending upon the response received, the data warehouse computer system may determine the presence of additional data, such as additional drivers, that require updated information.

Customer data requesters may also specify that "progressive ordering" be active or inactive. Where a progressive order is necessary (Step 930), the order is returned to the processes discussed above to acquire the additional information. (Step 935)

Request responses may be returned in various ways. (Step 940) For example, depending on the type of order, the return response can be specified as returnable when the entire order is complete. That is, when all of the data necessary for a particular order has been acquired from the separate information vendors. (Step 935) Further, responses may also be specified as returnable when each individual data request is filled. Responses may also be specified as requiring return regardless of the customer data acquired within 48 hours. Finally, in the special case of renewal orders, return may be specified when the data for all of a particular batch request has been acquired. Ultimately, the customer data responses are transmitted back to the mainframe computer system regardless of the method of return response specified.

Upon receipt of the batch file from the data warehouse system, the responses are matched with the archived requests to verify completion of all requests. (Step 950) An archive of the responses is kept in a tracking file which monitors the number and type of orders, the respective requesters, and the performance of the system in general. (Step 960)

Once the information interface has archived the received responses, a route response process determines the identity of the requesting individual or system, repackages customer data responses, and delivers them to the appropriate requester. (Step 970)

In addition to routing the received data response, a consolidated insurance profile is created. (Step 980) This consolidated profile is a uniform compendium of all external data retrieved for a particular policy household. The consolidated profile is dynamic in that it can be automatically updated each time a batch process returns requested information. This consolidated profile may also be viewed at any time by Risk Evaluators or operations personnel.

As mentioned above, the response from the data warehouse is routed to each initiating system. The initiating system may perform local verifications of the received data, or merely transmit the response back to the requester for verification as shown in FIG. 9.

F. CONCLUSION

Accordingly, the present invention provides a highly efficient method of automated data retrieval and risk assessment. Moreover, human resource expenditures are considerably reduced, substantially reducing overhead costs.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. The specification and examples are exemplary only. The true scope and spirit of the invention are defined by the following claims.

What is claimed is:

1. A method of controlling a computer network to assemble data and render decisions based on the data, the network including a main computer having a memory, and a data warehouse computer coupled to vendors of data, the method comprising the steps, performed by the main computer, of:

receiving a request to process an application at the main computer;

determining whether additional data is needed to process the application;

invoking information interface processes to retrieve the needed additional data through the data warehouse computer the step of invoking including the substeps of receiving orders to retrieve additional data at the data warehouse computer:

applying a series of vendor templates to the orders;

formatting the orders according to the data vendors;

sending formatted orders to the appropriate data vendors;

receiving data from the data vendors in response to the formatted orders;

matching the received data with the orders; and delivering the matched data to the main computer; and processing the application with the additional data received through the data warehouse.

2. The method of claim 1 further including the substep of:
    breaking down each order into constituent parts and identifying the data required for each of the constituent parts.

3. The method of claim 1 further including the steps of:
    archiving the application at the main computer; and
    corresponding the matched data at the main computer with the archived application.

4. The method of claim 1 further including the substeps of:
    storing the data received from the vendors; and
    verifying that all the requested data has been received.

5. The method of claim 1 further including the steps of:
    storing the formatted order in a historical file in the main computer; and
    updating the historical file with the received data.

6. The method of claim 5 further including the step of:
    checking the historical file for the requested data before invoking the information interfaces.

7. The method of claim 1 further including the steps of
    returning the order by the main computer to acquire the additional information.

8. The method of claim 1 further including the step of
    assigning each application a unique identifier.

9. A method of controlling a computer network to assemble data and render decisions based on the data, the network including a main computer having a memory, and a data warehouse computer coupled to vendors of data, the method comprising the steps, performed by the main computer, of:

receiving requests to process applications at the main computer;

determining whether additional data is needed to process each of the applications;

invoking information interface processes to retrieve the needed additional data for the applications through the data warehouse computer the step of invoking including the substeps of:

receiving orders to retrieve additional data at the data warehouse computer;

applying a series of vendor templates to the orders;

formatting the orders according to the data vendors;

sending formatted orders to the appropriate data vendors;

receiving data from the data vendors in response to the formatted orders;

matching the received data with the orders; and delivering the matched data to the main computer; and processing the applications with the additional data received through the data warehouse.

10. The method of claim 9, wherein the step of invoking interface processes includes the substep of
    creating a plurality of orders for data; and
    merging the data orders into a single batch.

11. The method of claim 10, wherein the step of invoking interface processes further includes the substep of archiving the batch.

12. The method of claim 10 further including the steps of
    storing a record of the orders prior to merging them into a batch.

13. A method of controlling a computer network to assemble data and render decisions based on the data for insurance policies, the network including a main computer having a memory, and at least data warehouse computer coupled to vendors of data, the method comprising the steps of:

receiving a policy application at an agent terminal linked to an agency computer;

creating a policy record at the agency computer for the policy application;

assigning a unique identification number to the created policy record;

transferring to the main computer a request to process the policy application corresponding to the policy record;

determining, by the main computer, whether additional data is needed to process the policy application;

invoking information interface processes by the main computer to retrieve the needed additional data through the data warehouse computer the step of invoking including the substeps of:

receiving orders to retrieve additional data at the data warehouse computer;

applying a series of vendor templates to the orders;

formatting the orders according to the data vendors;

sending formatted orders to the appropriate data vendors;

receiving data from the data vendors in response to the formatted orders;

matching the received data with the orders; and delivering the matched data to the main computer;

processing the policy application, by the main computer, with the additional data received through the data warehouse; and transferring the processed policy application to the agency computer.

14. The method of claim 13 wherein the step of determining whether additional data is needed to process the policy application includes the substeps of building a case file case for the policy application;

determining what information is needed to perform risk assessment for the policy application.

15. The method of claim 14 wherein the substep of determining what information is needed includes the substep of performing a series of pattern matchings using profiles of information needs, each profile including criteria to render a risk assessment decision.

16. The method of claim 14 further including the step of performing risk evaluation for the policy application.

* * * * *